Figure 1:
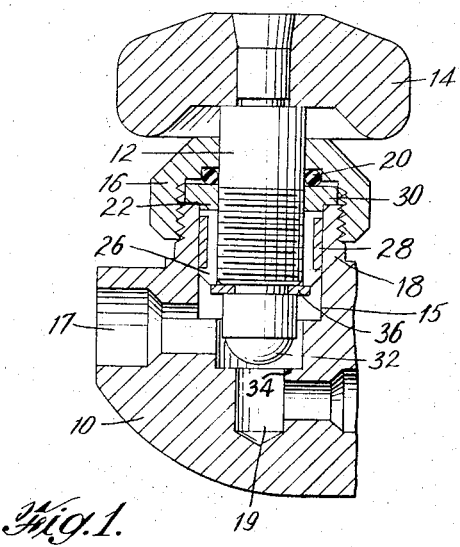

Aug. 29, 1967　　C. C. ANTHES ET AL　　3,338,549
ANTI-BACKLASH THROTTLE VALVE
Filed July 29, 1966

INVENTORS
CLIFFORD C. ANTHES
BYRON H. ACOMB
BY Richard S. Shreve
ATTORNEY

3,338,549
ANTI-BACKLASH THROTTLE VALVE
Clifford C. Anthes, Union, and Byron H. Acomb, Watchung, N.J., assignors to Union Carbide Corporation, a corporation of New York
Filed July 29, 1966, Ser. No. 582,777
5 Claims. (Cl. 251—224)

This application is a continuation-in-part of application Ser. No. 321,559, filed Nov. 5, 1963, now abandoned.

This invention relates to anti-backlash throttle valves.

Throttle valves for oxy-acetylene torches have been subject to chronic complaints, because of backlash and looseness. To reduce these complaints has required excessive care and expense during manufacture.

It is therefore the main object of the present invention to provide a low cost anti-backlash throttle valve.

Other objects are to provide a short overall length, which can be more closely coupled to the torch body, and to facilitate the construction and assembly of the parts of the valve.

According to the present invention, the valve stem threads are no longer a part of the body but are incorporated in a plastic bushing that is firmly held in a valve recess bore in the torch body. This feature overcomes the difficulty that has been experienced over the years with maintaining perfect concentricity of valve stem threads machined in torch bodies with the seating bore at the bottom of the valve recess of the body. Valve stem thread wear is taken on the stem and the threaded bushing, both of which are replaceable items and independent of the torch body.

The replaceable threaded bushing has a series of slit threaded projections on the lower portion of the bushing that are backed up by a compression spring which, in turn, automatically compresses these projecting sections of the bushing against the valve stem threads, thereby taking up for thread play and wear. Alternatively, good results can also be obtained without the use of a compression spring for holding the bushing against the valve stem by forming the bushing of a plastic material having flexible resiliency, the bushing being sized so that it always exerts a compressive force against the external threads of the valve stem. By removal of a retaining clip, the threaded bushing, sealing ring, and retaining nut can be removed from the stem and wheel assembly which means that these parts are not captive on the stem and wheel assembly. The construction permits use of a one-piece stem and wheel combination, and the removal of the nut, sealing ring, and bushing from the thread end of the stem permits use of the full thread diameter of the stem for the shank section which quite materially increases the strength of the stem where most needed.

The female thread of the valve assembly, since it is incorporated in a plastic bushing permits the use of such metals as aluminum or aluminum alloys without the attendant problem of galvanic corrosion between the stem part of the valve and the body which would normally have the female valve thread. The use of an aluminum alloy valve stem and wheel as one piece lightens the weight of the assembly as well as reduces manufacturing cost.

Figure 2:
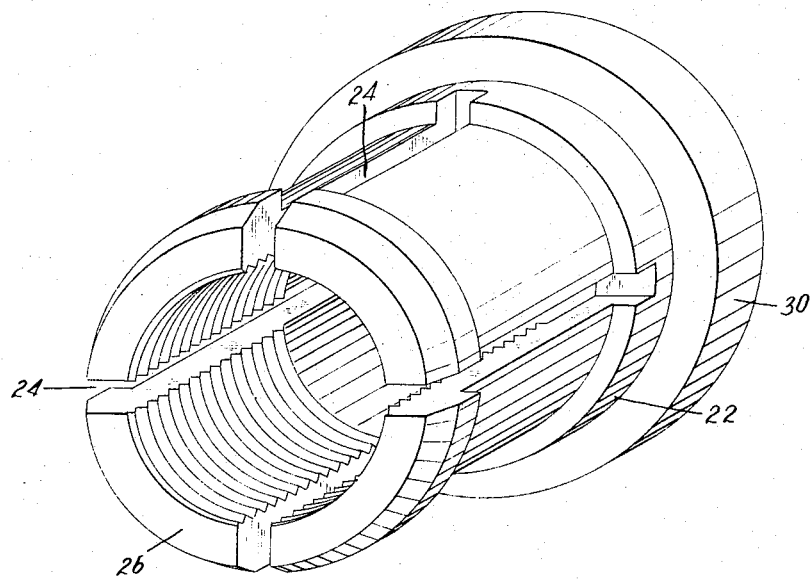

In the drawings:

FIGURE 1 is a vertical section through a valve according to the preferred embodiment of the present invention; and FIGURE 2 is a perspective view of the plastic bushing.

The valve comprises a body 10 preferably of non-ferrous metal having a bore 15 with fluid passages 17 and 19 connected thereto. The bore 15 forms a socket which receives an insert comprising a valve stem 12 provided with a valve wheel 14. The stem and wheel are shown as two separate parts staked together, but it is to be understood that they can be made unitary, as a single forged, cold headed, or turned piece.

The valve stem passes through a valve cap nut 16 which screws onto a threaded boss 18 surrounding the bore 15, to secure the bushing 22 and the stem assembly in the body socket. The nut 16 has an internal annular groove to receive an O-ring 20 surrounding the valve stem 12.

An intermediate portion of the valve stem 12 is externally threaded to secure thereon an internally threaded plastic bushing 22. The plastic is of low friction, low cold flow, and good flexible strength, e.g. nylon. It is also self-lubricating or containing a lubricant, such as a copolymer of adipic acid and hexamethylene diamine containing molybdenum bisulphide giving anti-friction properties, for example Nylatron GS rod, manufactured by the Polymer Corporation.

The lower portion of the plastic bushing 22 forms a skirt which is slotted as at 24 to form individually projecting fingers 26, the outside of the slotted skirt is annularly grooved to receive a split ring 28 of bond steel forming a contracting spring. In an alternative embodiment of the invention, the contracting spring split ring 28 can be omitted by forming the bushing 22 of the same plastic material, but sizing it with respect to the diameter of the valve stem so that when in place, the bushing will always exert a compressive force against the external threads of the valve stem 12. In this embodiment it is extremely important that the plastic material of which the bushing is formed, is not only flexible, but also resilient in order that it will continue to press against the valve stem 12 with thread wear. When the contracting spring split ring 28 is used however, it is not necessary that the plastic have resiliency so long as it is flexible, although a material possessing both characteristics is more desirable.

The upper portion of the plastic bushing 22 has a shoulder formed by a radial rim or annular flange 30 overlying the boss 18 and having a smooth periphery which clears the internal threads of the valve cap nut 16. The lower end of the valve stem 12 has a socket to receive a ball valve 32 which engages a valve seat 34 surrounding the port 19 in the valve body 10, and prevents passage of fluid between the ports 17 and 19.

The valve stem 12, between the threads thereon and the ball valve 32, is grooved to receive a C clip or snap ring 36, which is inserted therein after the nut 16, O-ring 20, bushing 22 and contracting spring 28 (if employed) have been installed in place on the valve stem.

The retaining nut 16 also serves to clamp the flange 30 against the body boss 18 so as to hold the bushing 22 against rotation in the body bore 15, and also to retain the O-ring 20 so as to seal against leakage from the valve bore to the atmosphere.

The contracting spring 28 (when used) tends to close in the fingers 26, which action automatically takes up any play between the internal threads of the bushing and the external threads of the valve stem. This spring action also takes up for wear that may take place between these two threads.

When the valve wheel 14 is turned to open the valve, the C clip 36 bears on the fingers 26, in turn urging the flange 30 against the nut 16, and thereby prevents full back out of the valve stem 12 from the torch body 10 which would cause a hazardous condition.

What is claimed is:

1. An anti-backlash throttle valve comprising a body having a bore with fluid passages connected thereto, a seat surrounding one of said passages, said bore forming a socket, an insert in said socket comprising a valve stem having a closure engaging said seat, said stem having a threaded portion, a threaded flexible, resilient plastic bushing on said threaded portion and mounted in said socket, and means for preventing movement of said bushing in said socket.

2. Valve as claimed in claim 1, in which said plastic bushing has a slotted skirt forming fingers, and means for contracting said fingers against said threaded portion of said valve stem.

3. Valve as claimed in claim 2, in which the outside of said plastic slotted skirt has an annular groove therein, and said contracting means comprises a split ring of bond steel mounted in said groove.

4. Valve as claimed in claim 3, in which said valve has a groove therein below the threads thereof, and a snap ring is mounted in said groove engaging the bottom of said fingers to prevent full back out of said valve stem.

5. An anti-backlash throttle valve comprising a body having a bore with fluid passages connected thereto, a threaded boss surrounding said bore, a seat surrounding one of said passages, said bore forming a socket, an insert in said socket comprising a valve stem having a closure engaging said seat, said stem having a threaded portion, an internally threaded flexible plastic bushing on said threaded portion and mounted in said socket, said bushing having an external annular flange overlying said threaded boss, and a cap nut through which said valve stem passes screwed onto said threaded boss and clamping said bushing flange thereto and means for compressing said bushing against the circumference of said stem to take up backlash and thread wear.

References Cited

UNITED STATES PATENTS

| | | | |
|---|---|---|---|
| 1,704,950 | 3/1929 | Price et al. | 251—224 |
| 1,774,994 | 9/1930 | Pfoutz | 251—284 X |
| 3,180,387 | 4/1965 | Dzus et al. | 151—21 |

WILLIAM F. O'DEA, *Primary Examiner.*

D. R. MATTHEWS, *Assistant Examiner.*